(12) United States Patent
Chisholm et al.

(10) Patent No.: US 6,844,417 B1
(45) Date of Patent: Jan. 18, 2005

(54) BROMINATED POLYCARBONATE FILMS

(75) Inventors: Bret Ja Chisholm, Clifton Park, NY (US); Dennis Joseph Coyle, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/667,253

(22) Filed: Sep. 19, 2003

(51) Int. Cl.$^7$ ................................................ C08G 64/00
(52) U.S. Cl. .................... 528/198; 264/176.1; 264/219; 359/223; 359/569; 428/64.4; 428/412; 528/196
(58) Field of Search .............................. 264/176.1, 219; 359/223, 569; 428/64.4, 412, 426; 528/196, 198

(56) References Cited

U.S. PATENT DOCUMENTS

| | | |
|---|---|---|
| 3,169,121 A | 2/1965 | Goldberg |
| 3,989,531 A | 11/1976 | Orlando et al. |
| 4,170,711 A | 10/1979 | Orlando et al. |
| 4,244,683 A | 1/1981 | Rowland |
| 4,486,363 A | 12/1984 | Pricone et al. |
| 4,487,896 A | 12/1984 | Mark et al. |
| 4,576,850 A | 3/1986 | Martens |
| 5,175,198 A | 12/1992 | Minnick et al. |
| 5,612,163 A | 3/1997 | Teramoto et al. |
| 5,855,983 A | 1/1999 | Williams |
| 5,977,265 A | 11/1999 | McCloskey et al. |
| 6,136,494 A | 10/2000 | Teramoto et al. |
| 6,280,063 B1 | 8/2001 | Fong et al. |
| 6,375,776 B1 | 4/2002 | Buoni et al. |
| 6,375,863 B1 | 4/2002 | Tachikawa et al. |
| 2003/0102591 A1 | 6/2003 | Thielman et al. |
| 2003/0108710 A1 * | 6/2003 | Coyle et al. ............... 428/64.4 |

FOREIGN PATENT DOCUMENTS

WO      WO 92/11319    *   7/1992

* cited by examiner

*Primary Examiner*—Terressa Boykin
(74) *Attorney, Agent, or Firm*—Cantor Colburn LLP

(57) ABSTRACT

Optical articles, including light management films, prepared from brominated polycarbonate material are disclosed. The brominated polycarbonate provides a film exhibiting good light transmittance, high refractive index, good flame resistance, and good mechanical properties.

14 Claims, 2 Drawing Sheets

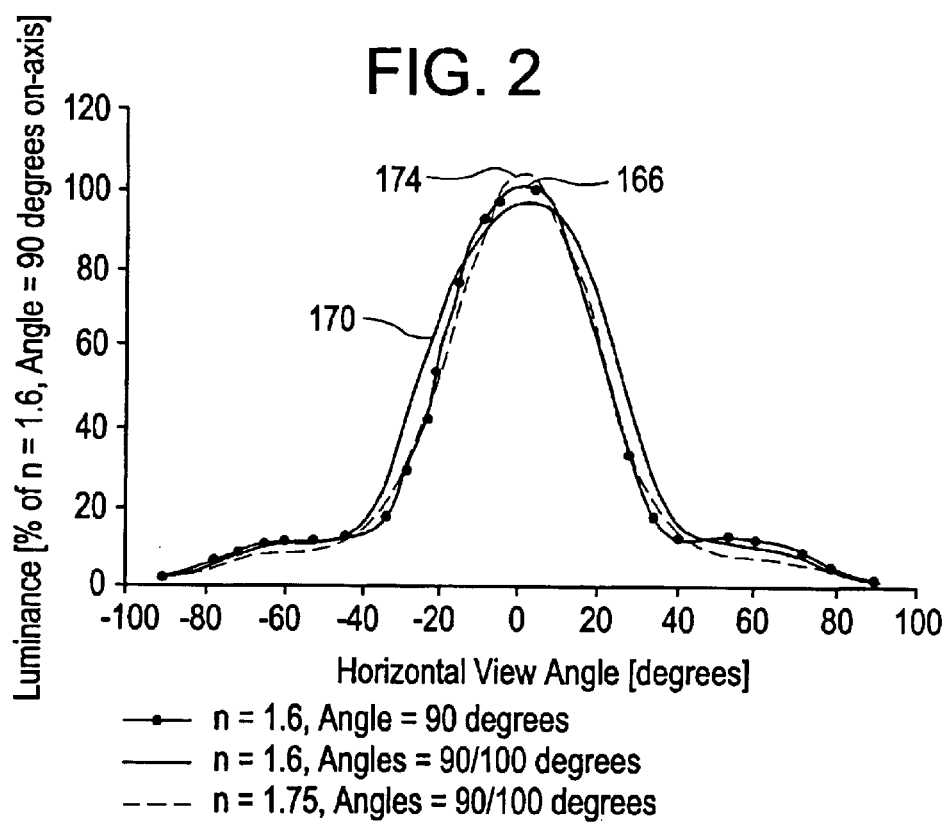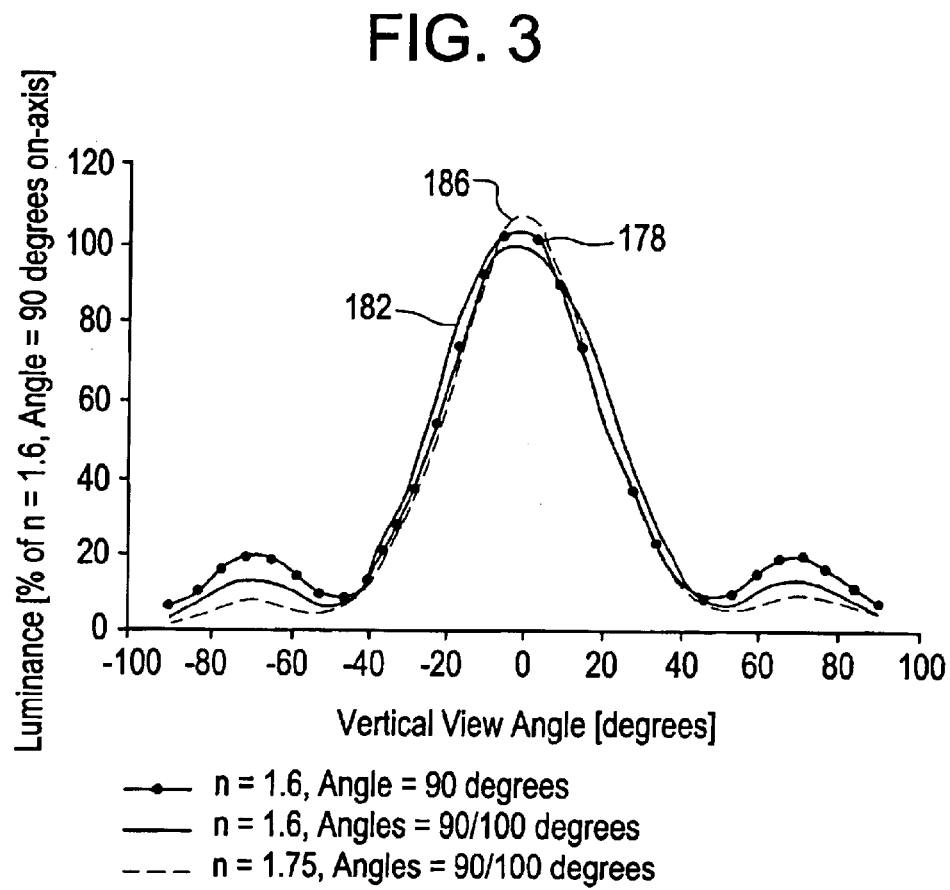

BROMINATED POLYCARBONATE FILMS

BACKGROUND OF INVENTION

In backlight computer displays or other display systems, optical films are commonly used to direct light. For example, in backlight displays, light management films use prismatic structures (often referred to as microstructure) to direct light along a viewing axis (i.e., an axis substantially normal to the display). Directing the light enhances the brightness of the display viewed by a user and allows the system to consume less power in creating a desired level of on-axis illumination. Films for turning or directing light can also be used in a wide range of other optical designs, such as for projection displays, traffic signals, and illuminated signs.

Materials suitable to form light management films desirably have particular physical and mechanical properties. The material should be easy to process to form the necessary microstructure to turn or direct light. The material should have a high index of refraction. Materials with high index of refraction provide light management films having better brightness than corresponding material having a lower index of refraction. Desirably the material has a glass transition temperature high enough to withstand the rigors of the particular application without deformation. Finally, the film material should provide minimal scattering or absorption of light Current materials for light management films include composites made from a combination of a curable material and a flat film substrate. The microstructure is contained in the cured portion of the composite, which is made by charging curable material to a structured mold followed by curing. The substrate film generally used is polyethyleneterephthalate (PET) or polycarbonate, which can be disposed on the curable material prior to the curing step. This combination results in the use of at least two materials and requires a number of steps to prepare the final structured film composite.

While a variety of materials are presently available for use in light management films, there remains a continuing need for still further improvement in the materials used to fabricate them, particularly materials that possess the combined attributes desired to satisfy the increasingly exacting requirements for light management film applications while at the same time resulting in a reduction in the number of materials and ease of production.

SUMMARY OF INVENTION

In one embodiment, an article comprises an optical film having a microstructure on a surface thereof, wherein the optical film comprises a brominated polycarbonate comprising 1 to about 45 weight percent bromine based on the total weight of the brominated polycarbonate.

In another embodiment, a method of preparing an article comprises molding a brominated polycarbonate to form an optical film having a microstructure on a surface thereof, wherein the brominated polycarbonate comprises 1 to about 45 weight percent bromine based on the total weight of the brominated polycarbonate.

BRIEF DESCRIPTION OF THE DRAWINGS

FIG. 2 is a graphical depiction of the far field horizontal luminance of crossed optical substrates as a function of horizontal viewing angle;

FIG. 3 is a graphical depiction of the far field vertical luminance of crossed optical substrates as a function of vertical viewing angle.

DETAILED DESCRIPTION

Figure 1:
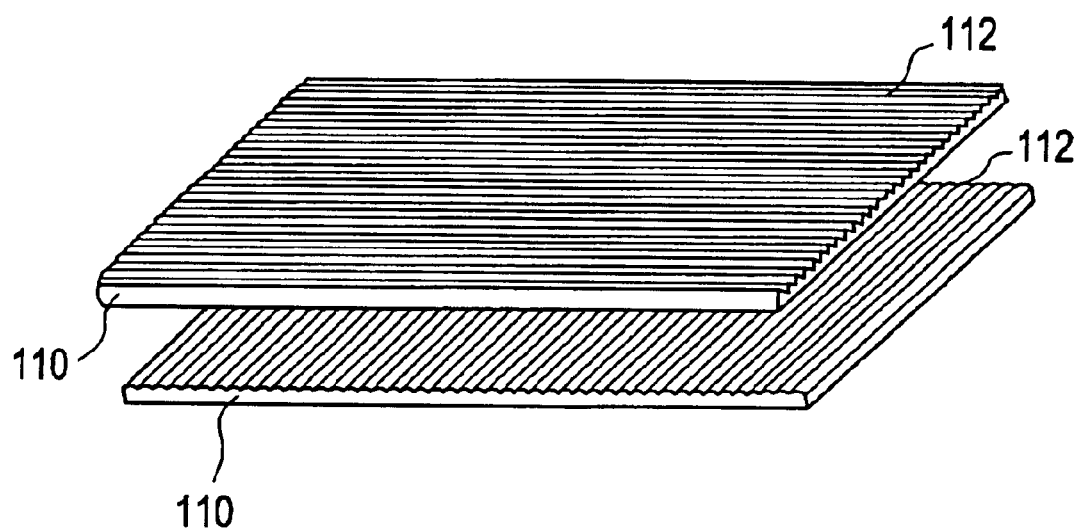
FIG. 1 is a perspective view of two optical substrates positioned in a crossed configuration wherein prismatic structures are positioned at an angle with respect to one another (e.g., 90 degrees)

It has been discovered that polycarbonate and copolycarbonate comprising brominated units, as well as their blends, provide a material ideally suited for optical films, such as light management films. The benefits of using brominated polycarbonate are that the material exhibits a high refractive index, good mechanical properties, good flame resistance, and is easy to process. Additionally, using a brominated polycarbonate for the optical film results in fewer materials and fewer steps in the process of preparing articles made from the films, including light management films, which is an advantage over the cured film composites available in the art.

As used herein, "brominated polycarbonate" is inclusive of polycarbonate, copolycarbonate, polyestercarbonate, and their blends wherein the polycarbonate, copolycarbonate, polyestercarbonate, and/or their blends comprise brominated units. Also contemplated are blends comprising brominated carbonate oligomers.

All ranges disclosed herein are inclusive and combinable.

Polycarbonate includes compositions having structural units of the formula (I):

(I)

in which greater than or equal to about 60 percent of the total number of $R^1$ groups are aromatic organic radicals and the balance thereof are aliphatic or alicyclic radicals. Preferably, $R^1$ is an aromatic organic radical and, more preferably, a radical of the formula (II):

(II)

wherein each of $A^1$ and $A^2$ is a monocyclic divalent aryl radical and $Y^1$ is a bridging radical having zero, one, or two atoms which separate $A^1$ from $A^2$. In an exemplary embodiment, one atom separates $A^1$ from $A^2$. Illustrative examples of radicals of this type are —O—, —S—, —S(O)—, —S(O)$_2$—, —C(O)—, methylene, cyclohexyl-methylene, 2-[2,2,1]-bicycloheptylidene, ethylidene, isopropylidene, neopentylidene, cyclohexylidene, cyclopentadecylidene, cyclododecylidene, adamantylidene, or the like. The bridging radical $Y^1$ can be a hydrocarbon group or a saturated hydrocarbon group such as methylene, cyclohexylidene or isopropylidene. In another embodiment, zero atoms separate $A^1$ from $A^2$, instead a covalent bond links $A^1$ to $A^2$.

Polycarbonates, in general, can be manufactured by known processes, including interfacial reaction and melt polymerization. For example, polycarbonates can be produced by the interfacial reaction of dihydroxy compounds in which only one atom separates $A^1$ and $A^2$. As used herein, the term "dihydroxy compound" includes, for example, bisphenol compounds having general formula (III) as follows:

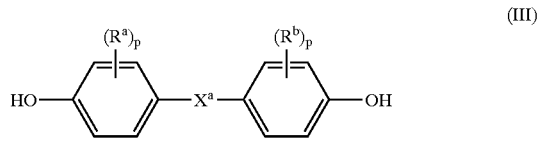

wherein $R^a$ and $R^b$ each independently represent hydrogen, a halogen atom, preferably bromine, or a monovalent hydrocarbon group; p and q are each independently integers from 0 to 4; and $X^a$ represents one of the groups of formula (IV):

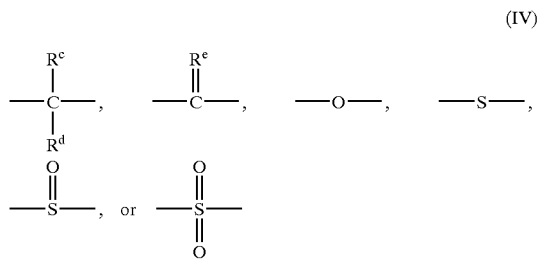

wherein $R^c$ and $R^d$ each independently represent a hydrogen atom or a monovalent linear or cyclic hydrocarbon group, and $R^e$ is a divalent hydrocarbon group, oxygen, or sulfur.

Examples of the types of bisphenol compounds that may be represented by formula (III) include the bis(hydroxyaryl) alkane series such as, 1,1-bis(4-hydroxyphenyl)methane, 1,1-bis(4-hydroxyphenyl)ethane, 2,2-bis(4-hydroxyphenyl) propane (or bisphenol A), 2,2-bis(4-hydroxyphenyl)butane, 2,2-bis(4-hydroxyphenyl)octane, 1,1-bis(4-hydroxyphenyl) propane, 1,1-bis(4-hydroxyphenyl)n-butane, bis(4-hydroxyphenyl)phenylmethane, 2,2-bis(4-hydroxy-1-methylphenyl)propane, 1,1-bis(4-hydroxy-t-butylphenyl) propane, 2,2-bis(4-hydroxy-3-bromophenyl)propane, or the like; bis(hydroxyaryl)cycloalkane series such as, 1,1-bis(4-hydroxyphenyl)cyclopentane, 1,1 -bis(4-hydroxyphenyl) cyclohexane, or the like, or combinations comprising at least one of the foregoing bisphenol compounds.

Other examples of bisphenol compounds that may be represented by formula (III) include those where $X^a$ is —O—, —S—, —S(O)—, or —S(0)$_2$—, such as 4,4'-dihydroxy diphenylether, 4,4'-dihydroxy-3,3'-dimethylphenyl ether, or the like; bis(hydroxy diaryl) sulfides, such as 4,4'-dihydroxy diphenyl sulfide, 4,4'-dihydroxy-3,3'-dimethyl diphenyl sulfide, or the like; bis (hydroxy diaryl) sulfoxides, such as, 4,4'-dihydroxy diphenyl sulfoxides, 4,4'-dihydroxy-3,3'-dimethyl diphenyl sulfoxides, or the like; bis(hydroxy diaryl)sulfones, such as 4,4'-dihydroxy diphenyl sulfone, 4,4'-dihydroxy-3,3'-dimethyl diphenyl sulfone, or the like; or combinations comprising at least one of the foregoing bisphenol compounds. The compounds comprising sulfur also provide the added benefit of increased refractive indices.

Examples of the types of brominated bisphenol compounds that may be represented by formula (III) include 2,2-bis(3,5-dibromo-4-hydroxyphenyl)propane (TBBPA); bis(3,5-dibromo-4-hydroxyphenyl)methanone; and the like.

Other dihydroxy compounds that may be utilized in the polycondensation of polycarbonate are represented by the formula (V):

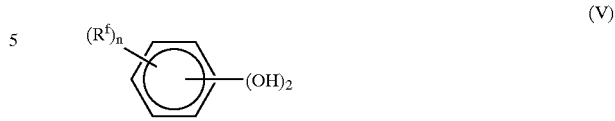

wherein, $R^f$, is a halogen atom, a hydrocarbon group having 1 to 10 carbon atoms, or a halogen substituted hydrocarbon group; n is a value from 0 to 4. The halogen is preferably bromine. When n is at least 2, $R^f$ may be the same or different. Examples of compounds that may be represented by the formula (V), are resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones, such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafloro hydroquinone, 2,3,5,6-tetrabromo hydroquinone, or the like; or combinations comprising at least one of the foregoing compounds.

Bisphenol compounds such as 2,2,2',2'-tetrahydro-3,3,3', 3'-tetramethyl-1,1'-spirobi-[IH-indene]-6,6'-diol represented by the following formula (VI) may also be used as the dihydroxy compound:

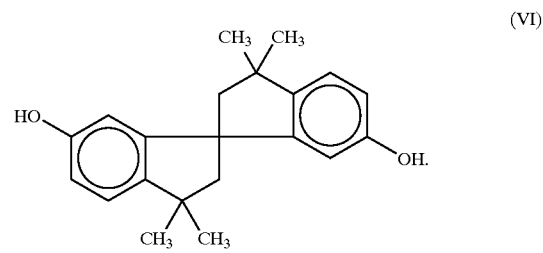

Typical carbonate precursors include the carbonyl halides, for example carbonyl chloride (phosgene), and carbonyl bromide; the bis-haloformates, for example the bis-haloformates of dihydric phenols such as bisphenol A, hydroquinone, or the like, and the bis-haloformates of glycols such as ethylene glycol and neopentyl glycol; and the diaryl carbonates, such as diphenyl carbonate, di(tolyl) carbonate, and di(naphthyl) carbonate. The preferred carbonate precursor for the interfacial reaction is carbonyl chloride.

Branched polycarbonate, as well as blends of linear polycarbonate and a branched polycarbonate may also be used. The branched polycarbonate may be prepared by adding a branching agent during polymerization. These branching agents may comprise polyfunctional organic compounds containing at least three functional groups, which may be hydroxyl, carboxyl, carboxylic anhydride, haloformyl, and combinations comprising at least one of the foregoing branching agents. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) α,α-dimethyl benzyl)phenol), 4-chloroformyl phthalic anhydride, trimesic acid, benzophenone tetracarboxylic acid, or the like, or combinations comprising at least one of the foregoing branching agents. The branching agents may be added at a level of about 0.05 to about 2.0 weight percent (wt %), based upon the total weight of the polycarbonate.

In one embodiment, the polycarbonate may be produced by a melt polycondensation reaction between a dihydroxy compound and a carbonic acid diester. Examples of the carbonic acid diesters that may be utilized to produce the polycarbonates are diphenyl carbonate, bis(2,4-dichlorophenyl)carbonate, bis(2,4,6-trichlorophenyl) carbonate, bis(2-cyanophenyl) carbonate, bis(o-nitrophenyl) carbonate, ditolyl carbonate, m-cresyl carbonate, dinaphthyl carbonate, bis(diphenyl) carbonate, diethyl carbonate, dimethyl carbonate, dibutyl carbonate, dicyclohexyl carbonate, or the like, or combinations comprising at least one of the foregoing carbonic acid diesters. The preferred carbonic acid diester is diphenyl carbonate.

Also suitable are polyestercarbonates, also known as copolyester-polycarbonates, that is, resins which contain, in addition to recurring polycarbonate chain units of the formula (VII):

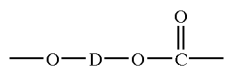
(VII)

wherein D is a divalent radical of a dihydroxy compound employed in the polymerization reaction, the dihydroxy-compound as described previously; repeating or recurring carboxylate units, for example of the formula (VIII):

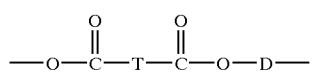
(VIII)

wherein D is as defined above and T is an aromatic radical such as phenylene, naphthylene, biphenylene, substituted phenylene and the like; a divalent aliphatic-aromatic hydrocarbon radical such as an alkaryl or alkaryl radical; or two or more aromatic groups connected through such aromatic linkages which are known in the art. When substituted, the substitution on the D and T groups is preferably bromine.

The copolyester-polycarbonate resins are also prepared by interfacial polymerization technique, well known to those skilled in the art (see, for example, U.S. Pat. Nos. 3,169,121 and 4,487,896).

In general, any dicarboxylic acid used in the preparation of linear polyesters may be utilized in the preparation of the polyestercarbonate resins. Generally, the dicarboxylic acids which may be utilized includes aliphatic dicarboxylic acids, aromatic dicarboxylic acids, and aliphatic aromatic dicarboxylic acids. These acids are well known and are disclosed, for example, in U.S. Pat. No. 3,169,121. Mixtures of dicarboxylic acids may be employed. Preferred as aromatic dicarboxylic acids are isophthalic acid, terephthalic acids, and mixtures thereof. A particularly useful difunctional carboxylic acid comprises a mixture of isophthalic acid and terephthalic acid wherein the weight ratio of terephthalic acid to isophthalic acid is in the range of from about 10:1 to about 0.2:9.8.

Rather than utilizing the dicarboxylic acid per se, it is possible, and sometimes even preferred, to employ the reactive derivatives of the acid. Illustrative of these reactive derivatives are the acid halides. The preferred acid halides are the acid dichlorides and the acid dibromides. Thus, for example instead of using isophthalic acid, terephthalic acid or mixtures thereof, it is possible to employ isophthaloyl dichloride, terephthaloyl dichloride, and mixtures thereof.

In general, the amount of bromine present in the brominated polycarbonate may be about 1 to about 45 weight percent, preferably about 10 to about 40 weight percent, more preferably about 15 to about 35 weight percent, and yet more preferably about 20 to about 30 weight percent based on the total weight of the brominated polycarbonate.

In one embodiment, the brominated polycarbonate is a copolycarbonate prepared from brominated and unbrominated dihydroxy compounds. In this embodiment, the ratio of brominated units to unbrominated units in the copolycarbonate is chosen to provide an amount of bromine of about 1 to about 45 weight percent, preferably about 10 to about 40 weight percent, more preferably about 15 to about 35 weight percent, and yet more preferably about 20 to about 30 weight percent based on the total weight of the copolycarbonate.

A preferred brominated polycarbonate is a copolycarbonate comprising structural units derived from bisphenol A and tetrabromobisphenol A. A suitable polycarbonate of this type includes that produced by GE Plastics under the tradename LEXAN PC105B.

Brominated polycarbonates also include blends of polycarbonate, copolycarbonate, and/or polyestercarbonate. When a blend is used, the components of the blend are preferably miscible and films prepared from the blends are in a suitable ratio to provide a ductile material having a high transparency to visible light. Binary blends, ternary blends, and blends having more than three components may also be used. When a binary blend or ternary blend is used, one of the components may be present at about 1 to about 99 weight percent based on the total weight of the blend, preferably about 20 to about 90 weight percent, more preferably about 30 to about 80 weight percent, and yet more preferably about 40 to about 60 weight percent based on the total weight of the blend. When ternary blends or blends having more than three polymeric resins are used, the various components may be present in any desirable weight ratio to provide a ductile material.

Brominated polycarbonate is also inclusive of blends comprising brominated carbonate oligomer. Such brominated carbonate oligomers comprise about 1 to about 80 weight percent bromine based on the total weight of the oligomer, preferably about 10 to about 70 weight percent, and more preferably about 30 to about 60 weight percent, and yet more preferably about 40 to about 55 weight percent bromine based on the total weight of the brominated oligomer. Suitable brominated oligomers include those commercially available from Great Lakes Chemical, including for example those under the trade name GREAT LAKES BC-52, GREAT LAKES BC-52 HP, GREAT LAKES BC-58, and GREAT LAKES PE-68.

When used in a blend, the brominated carbonate oligomer may be present in an amount of about 1 to about 55 weight percent based on the total weight of the blend, preferably about 10 to about 45 weight percent, and more preferably about 20 to about 35 weight percent.

In one embodiment, the brominated polycarbonate comprises a blend of brominated carbonate oligomers and a polycarbonate free of bromine. The ratio of brominated carbonate oligomer to the polycarbonate free of bromine may be chosen to provide an amount of bromine of about 1 to about 45 weight percent, preferably about 10 to about 40 weight percent, more preferably about 15 to about 35 weight percent, and yet more preferably about 20 to about 30 weight percent based on the total weight of the blend.

In another embodiment, the brominated polycarbonate comprises a blend of brominated carbonate oligomers and a copolycarbonate prepared from a brominated dihydroxy compound and a dihydroxy compound free of bromine. Within this embodiment, the ratio of brominated carbonate oligomer to the copolycarbonate may be chosen to provide an amount of bromine of about 1 to about 45 weight percent, preferably about 10 to about 40 weight percent, more preferably about 15 to about 35 weight percent, and yet more preferably about 20 to about 30 weight percent based on the total weight of the blend.

Preferably, the number average molecular weight of the polycarbonate is about 3,000 to about 1,000,000 grams/mole (g/mole). Within this range, it is desirable to have a number average molecular weight of greater than or equal to about 10,000, preferably greater than or equal to about 20,000 g/mole, and more preferably greater than or equal to about 25,000 g/mole. Also desirable is a number average molecular weight of less than or equal to about 100,000, preferably less than or equal to about 75,000, more preferably less than or equal to about 50,000 g/mole, and most preferably less than or equal to about 35,000 g/mole.

Films prepared from the brominated polycarbonate preferably have properties desired for optical applications such as a high transmission of light, a high refractive index, low haze, and good glass transition temperature (Tg). Preferably the brominated polycarbonate film transmits light at greater than or equal to about 90 percent of light and more preferably greater than or equal to about 95 percent.

The refractive index of the film may be greater than or equal to about 1.55, preferably greater than or equal to about 1.58, and more preferably greater than or equal to about 1.59.

The haze of the brominated polycarbonate film is preferably less than or equal to about 5 percent and less than or equal to about 2 percent preferred.

The Tg of the brominated polycarbonate may be greater than about 150° C., preferably greater than or equal to about 160° C., and more preferably greater than or equal to about 170° C.

A further advantage of the use of brominated polycarbonate is the resulting optical film prepared from such material exhibits excellent flame resistance properties. Indeed brominated polycarbonate has been used as a flame retardant additive in other polymeric material, such as polyesters. In one embodiment, the optical film exhibits at least a VTM-2 flammability rating and preferably a VTM-1 flammability rating as defined by Underwriters Laboratories Inc. UL 94 flame classifications, Edition 5 of Oct. 29, 1996, Standard for Tests for Flammability of Plastic Materials for Parts in Devices and Appliances.

The brominated polycarbonate described herein may be prepared into a variety of articles, including optical film having optical clarity, dimensional stability, impact resistance, processability, and scratch resistance. Such articles include brightness enhancing films, light management films, Fresnel lens elements, diffraction gratings, video discs, reflectors, ophthalmic lenses, projection displays, traffic signals, illuminated signs, and other optical articles having replicated microstructure-bearing surfaces.

Preferred articles include brightness enhancing and light management films. These films may be used to direct light and generally comprise a plurality of prismatic structures often referred to as microstructure. As used herein, microstructure includes prismatic structures or textured structures formed in the optical film that are capable of directing or redirecting light. For example, in backlight displays, light management films comprising prismatic structures direct light along a viewing axis (i.e., an axis substantially normal to the display), which enhances the brightness of the light viewed by the user of the display and which allows the system to use less power to create a desired level of on-axis illumination.

In one embodiment, the microstructure includes the structure described in U.S. Pat. No. 4,576,850 to Martens. As described therein, the term "microstructure" is defined as the configuration of a surface that allows for a desired utilitarian purpose or function of the article having the microstructure. Discontinuities such as projections and indentations in the surface of the article will deviate in profile from the average center line drawn through the microstructure such that the sum of the areas embraced by the surface profile above the center line is equal to the sum of the areas below the line, said line being essentially parallel to the nominal surface (bearing the microstructure) of the article. The heights of the deviations will typically be about ±0.005 to ±750 micrometers, as measured by an optical or electron microscope, through a representative characteristic length of the surface, e.g., 1–30 centimeters. The average center line can be plano, concave, convex, aspheric, or combinations thereof. Articles where the deviations are of low order, e.g., from ±0.005 to ±0.1 or, preferably, to ±0.05 microns, and the deviations are of infrequent or minimal occurrence, i.e., the surface is free of any significant discontinuities, are those where the microstructure-bearing surface is an essentially "flat" or "smooth" surface, such articles being useful, for example, as precision optical elements or elements with a precision optical interface, such as ophthalmic lenses. Articles where the deviations are of low order and of frequent occurrence include those having anti-reflective microstructure. Articles where the deviations are of high order, e.g., from ±0.1 to ±750 micrometers, and attributable to microstructure comprising a plurality of utilitarian discontinuities which are the same or different and spaced apart or contiguous in a random or ordered manner, are articles such as retroreflective cube-corner sheeting, linear Fresnel lenses, video discs and light management films. The microstructure-bearing surface can contain utilitarian discontinuities of both the low and high orders. The microstructure-bearing surface may contain extraneous or non-utilitarian discontinuities so long as the amounts or types thereof do not significantly interfere with or adversely affect the predetermined desired utilities of the articles.

The refractive index of the materials used for the optical film is important, especially to impart good brightness for microstructured films such as light management films. It is known that by using materials having greater refractive indices for light management films results in an increase in brightness or luminance of the light viewed by the user of the display. For example, light enhancing films may employ two optical substrates 110 positioned in a crossed configuration wherein the prismatic structures 112 are positioned at an angle with respect to one another (e.g., 90 degrees) as shown in FIG. 1. FIG. 2 shows a graphical depiction of the far field horizontal luminance of crossed optical substrates, as in FIG. 1, as a function of horizontal viewing angle. In FIG. 2, a luminance profile based upon a refractive index of 1.60 and a peak prism angle of 90 degrees is shown at 166. As further seen at 170 in FIG. 2, by increasing the peak angle from 90 degrees to about 100 degrees while keeping the refractive index of the substrate at 1.60, the central segment of the luminance is only slightly less. By increasing the refractive index of the substrates to about 1.75 and the peak prism angle to about 100 degrees, as seen at 174, the central portion of the luminance profile (e.g. +/−30 degrees) displays a higher peak luminance (about 105).

Similarly, FIG. 3 shows a graphical depiction of the far field vertical luminance of crossed optical substrates as a function of vertical viewing angle. In FIG. 3, a luminance profile based upon a refractive index of 1.60 and a peak prism angle of 90 degrees is shown at 178. As seen at 182 in FIG. 3, by increasing the peak angle from 90 degrees to about 100 degrees while keeping the refractive index of the substrate at 1.60, the central segment of the luminance is only slightly less. By increasing the refractive index of the substrates to about 1.75 and the peak prism angle to about 100 degrees, as seen at 186, the central portion of the luminance profile (e.g. +/−30 degrees) displays a higher peak luminance (about 105).

Thus, it can be seen from FIGS. 2–3 that by increasing the refractive index of the substrate 110, an improvement is realized in an increase in the on-axis luminance of the optical substrate 110.

There is no particular limitation to the methods used to produce the optical films comprising microstructure. Suitable methods to create microstructure in a brominated polycarbonate film include calendaring, embossing processes, hot stamping, molding, and the like. A suitable embossing method is described in U.S. patent application Pub. No. 2003/0102591 to Thielman et al., which describes a process and apparatus for embossing precise microstructures onto the surface of thermoplastic film. The process allows for the continuous embossing of a microstructured surface onto a thermoplastic film by continuously feeding the thermoplastic material through a double band press. At least one of the bands has a tool surface having the inverse topography of the precision microstructured surface to be formed. The thermoplastic material is heated to its embossing temperature and pressure is applied to the material as it moves through the press to cause the precise engagement of the heated thermoplastic material with the bands and the tool surface to emboss the material with the microstructured pattern. Finally, pressure is maintained while the material cools to result in a thermoplastic film comprising a microstructured surface. Other useful embossing techniques are described in U.S. Pat. No. 4,244,683 to Rowland and U.S. Pat. No. 4,486,363 to Pricone et al.

Films prepared from brominated polycarbonate may be prepared in a wide range of thicknesses. The optical films for light management films may have a thickness of about 25 micrometers to about 700 micrometers, preferably about 50 to about 400 micrometers, more preferably about 100 to about 250 micrometers, and yet more preferably about 150 to about 200 micrometers.

All cited patents, patent applications, and other references are incorporated herein by reference in their entirety. The invention is further illustrated by the following non-limiting examples.

EXAMPLES

The formulations for the following Examples were prepared from the components listed in Table 1.

TABLE 1

| Material | Description | Source |
| --- | --- | --- |
| BPA-PC | Bisphenol A polycarbonate | GE Plastics |
| Br-PC | PC105B polycarbonate copolymer comprising units of bisphenol A and tetrabromobisphenol A, 24–29 percent bromine by weight | GE Plastics |

TABLE 1-continued

| Material | Description | Source |
| --- | --- | --- |
| BC-58 | 2,4,6-tribromophenyl-terminated tetrabromobisphenol A carbonate oligomer, 58 percent bromine by weight | Great Lakes Chemical |

The refractive index (RI) of the polycarbonate films was measured using a Bausch and Lomb Abbe-3L refractometer; the wavelength associated with the measurement was 589.3 manometers.

The glass transition temperature (Tg) of the polycarbonate material was measured using a Perkin Elmer DSC7 Differential Scanning Calorimeter. The heating rate used for the measurement was 20°/minute.

Example 1 and Comparative Example 1. Br-PC (Example 1) and BPA-PC (Comparative Example 1) were tested for RI and Tg and the results are provided in Table 2.

TABLE 2

| Properties | Example 1 | Comparative Example 1 |
| --- | --- | --- |
| Tg (° C.) | 179 | 150 |
| RI | 1.5990 | 1.585 |

As the results in Table 2 illustrate, not only does the brominated polycarbonate exhibit excellent RI as compared to the non-brominated counterpart, but it also provides a good thermomechanical property.

Examples 2–9

Blends of brominated polycarbonate and non-brominated polycarbonate were prepared to illustrate a range of materials suitable for optical films. Also provided are blends of brominated oligomers with brominated and non-brominated polycarbonate. All blends were produced by shaking the powder mixtures of raw materials to provide uniform powder mixtures. The particular formulations prepared are found in Table 3 with weights in grams (g). The powder mixtures were dried in a vacuum oven overnight at 105° C. and subsequently melt extruded using a WE 20 mm twin-screw extruder operating at a speed of 300 rpm and barrel temperature setting of 525° F. (274° C.). The extrudate was formed into strands and passed through a water bath before being chopped into pellets. The pellets were dried in vacuo at 110° C. and films were made from the pellets using a heat press. The resulting blends were tested for RI, Tg, and miscibility by visual inspection; all results are provided in Table 3.

TABLE 3

| Raw Material | Example | | | | | | | |
|---|---|---|---|---|---|---|---|---|
| | 2 | 3 | 4 | 5 | 6 | 7 | 8 | 9 |
| BPA-PC | — | — | — | 340 g | 120 g | 200 g | 340 g | 280 g |
| Br-PC | 340 g | 280 g | 200 g | — | — | — | 60 g | 120 g |
| BC-58 | 60 g | 120 g | 200 g | 60 g | 280 g | 200 g | — | — |
| Appearance | Transparent | Transparent | Transparent | Transparent | Transparent | Opaque | Transparent | Transparent |
| RI | 1.6010 | 1.6073 | 1.6129 | 1.5910 | 1.5950 | — | 1.5902 | 1.5922 |
| Tg (° C.) | 176.8 | 179.8 | 184.25 | 154.4 | 157.05 | — | 158.4 | 160.6 |

As shown in Table 3, blends of BPA-PC, BR-PC, and/or brominated oligomers provide materials having excellent RI (greater than 1.59) and glass transition temperatures greater than non-brominated BPA polycarbonate.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An article, comprising:
   an optical film having a microstructure on a surface thereof, wherein the optical film comprises a brominated polycarbonate comprising 1 to about 45 weight part bromine based on the total weight of the brominated polycarbonate.

2. The article of claim 1, wherein the brominated polycarbonate has a refractive index greater tan or equal to about 1.585.

3. The article of claim 1, wherein the brominated polycarbonate has a refractive index greater than or equal to about 1.595.

4. The article of claim 1, where the brominated polycarbonate is derived from Bisphenol A and tetrabromobisphenol A.

5. The article of claim 1, wherein the brominated polycarbonate comprises a blend of a non-brominated polycarbonate and a polycarbonate comprising brominated units.

6. The article of claim 1, wherein the brominated polycarbonate comprises a blend of a non-brominated polycarbonate and a brominated carbonate oligomer.

7. The article of claim 6, wherein the blend comprises about 30 to about 60 weight percent brominated carbonate oligomer based on the total weight of the blend.

8. The article of claim 1, wherein the brominated polycarbonate comprises a blend of brominated carbonate oligomer and a polycarbonate comprising brominated units.

9. The article of claim 8, wherein the polycarbonate comprising brominated units is derived from Bisphenol A and tetramobisphenol A.

10. The article of claim 1, wherein the optical film exhibits a VTM-2 flammability rating according to UL 94 Edition 5 of Oct. 29, 1996.

11. The article of claim 1, wherein the optical film exhibits a VTM-1 flammability rating according to UL 94 Edition 5 of Oct. 29. 1996.

12. The article of claim 1, wherein the article is a brightness enhancing film, a light management film, a Fresnel lens element, a diffraction grating, a video disc, a reflector, an ophthalmic lens, a projection display, a traffic signal, or an illuminated sign.

13. A method of preparing an article, comprising:
   molding a brominated polycarbonate to form an optical film having a microstructure on a surface thereof,
   wherein the brominated polycarbonate comprises 1 to about 45 weight percent bromine based on the total weight of the brominated polycarbonate.

14. The method of claim 13, wherein the molding comprises calendaring, molding, embossing, hot stamping, or a combination comprising at least one of the foregoing.

* * * * *

UNITED STATES PATENT AND TRADEMARK OFFICE
CERTIFICATE OF CORRECTION

PATENT NO. : 6,844,417 B1
DATED : January 18, 2005
INVENTOR(S) : Chisholm et al.

It is certified that error appears in the above-identified patent and that said Letters Patent is hereby corrected as shown below:

Column 3,
Line 5, in the formula, delete "$(R^b)_p$" and insert therefor -- $(R^b)_q$ --

Column 8,
Line 23, after "can be" delete "pIano" and insert therefor -- plano --

Column 10,
Line 14, after "was 589.3" delete "manometers" and insert therefor -- nanometer --

Column 11,
Line 35, before "bromine" delete "part" and insert therefor -- percent --
Line 38, after "greater" delete "tan" and insert therefor -- than --

Signed and Sealed this

Third Day of May, 2005

JON W. DUDAS
*Director of the United States Patent and Trademark Office*